Dec. 26, 1967  E. HAMEL  3,359,758
ROLLER AND COUPLING ASSEMBLY
Filed Dec. 13, 1965
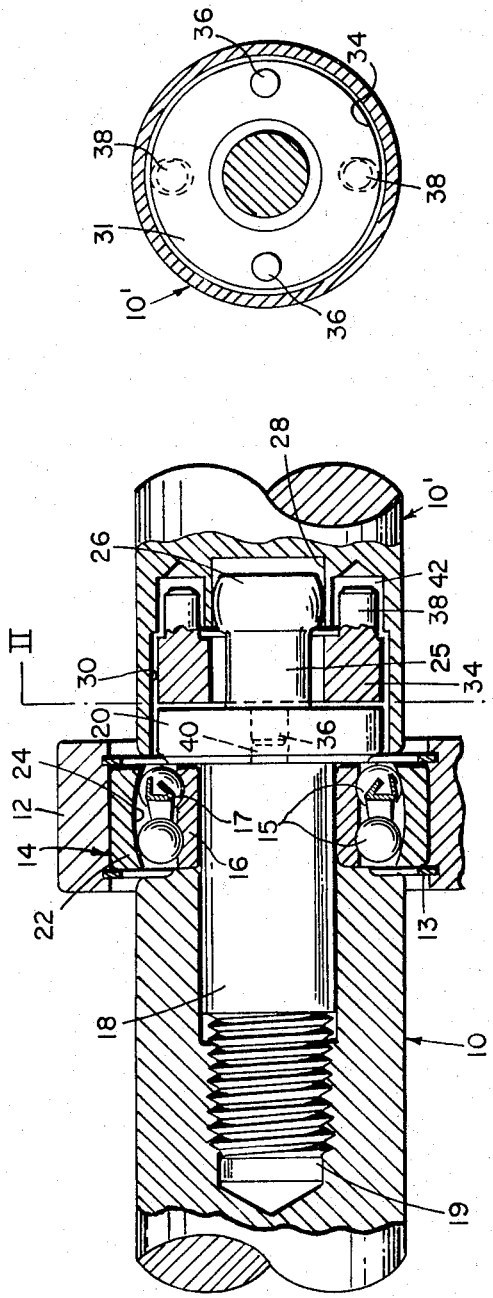
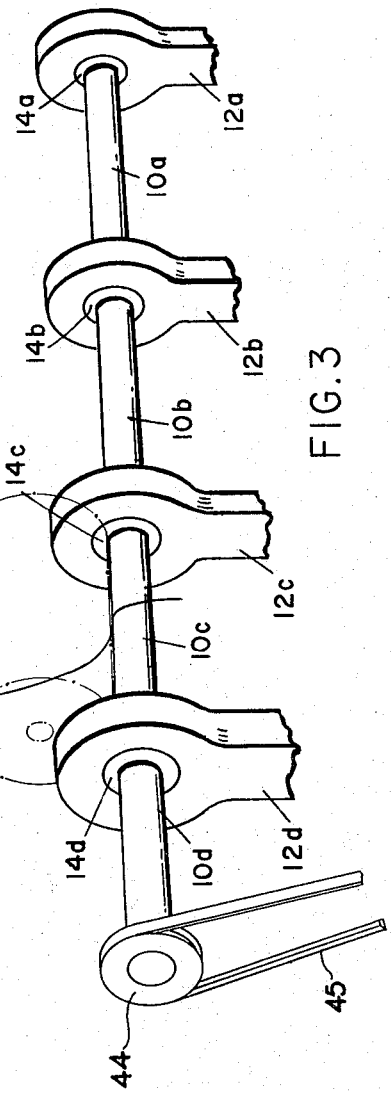
Edmund Hamel
INVENTOR.
BY
Attorney United States Patent Office 3,359,758
Patented Dec. 26, 1967

1

3,359,758
ROLLER AND COUPLING ASSEMBLY
Edmund Hamel, Romanshorn, Thurgau, Switzerland, assignor to Hamel Projektierungs- und Verwaltungs A.G., a corporation of Switzerland
Filed Dec. 13, 1965, Ser. No. 513,342
Claims priority, application Germany, Dec. 11, 1964, H 54,556
8 Claims. (Cl. 64—10)

ABSTRACT OF THE DISCLOSURE

Flexible roller axially subdivided into sections which are interconnected by coupling members affording a certain angular and radial play to adjoining sections, each section having an extremity journaled in a support by means of ball bearings which are held in position by a retaining plate, such as a bolt head, having bores to receive with loose fit a set of projections on the adjoining coupling member.

My present invention relates to a roller assembly of the type wherein an elongated roller is axially subdivided into a plurality of adjoining sections and is journaled on a machine frame by bearings located at or near the junctions of the several sections. Such roller assemblies are typically employed as feed rollers in spinning and twisting machines to advance, in co-operation with contacting pressure rollers, the threads or yarns used in machines of this kind.

Conventional composite feed rollers of this description are assembled from sections which are threadedly interconnected and between which there are clamped the inner races of respective ball bearings whose outer races, with the exception of one, are generally mounted with freedom of limited axial displacement to allow for dimensional changes due to varying temperatures. The holders for the outer bearing races must be supported by the machine frame in precise axial alignment in order to avoid any objectionable deformation of the composite roller. Such precise alignment, however, cannot always be maintained since the machine base or the floor of the shop may locally settle so that, pending readjustment, the roller and its bearing may be subjected to excessive transverse stresses which could lead to a rupture, especially at the joints.

The general object of my present invention is to provide a roller assembly of the character set forth which is capable of absorbing such transverse stresses by virtue of the fact that its several sections admit of limited relative angular displacement in a common axial plane.

The shiftability of the bearings needed to allow for thermal expansion, in the case of the conventional rollers described above, must increase with distance from the fixed bearing so that the amount of play to be provided therefor becomes very great in the case of long rollers. Since this is also inconvenient and detrimental to the stability of the assembly, it is another object of my invention to provide an improved arrangement in which such mobility is not required.

A roller assembly according to this invention has the extremities of adjoining sections interconnected by coupling means affording freedom of limited relative axial shifting and coplanar angular displacement, one of these extremities carrying a preferably ball-type bearing received in a support which no longer needs to allow for axial displacement and which therefore can be fixed to the machine during the operation of the roller inasmuch as all longitudinal dimensional changes are absorbed by the axial play of the intersectional coupling means.

2

In a preferred embodiment, the inner race of a journal bearing is clamped onto one of the loosely and detachably interconnected extremities and, through the intermediary of its balls, is swingably lodged in an associated outer race fixedly held in its support. The clamping means may take the form of a screw-threaded bolt having a plate-shaped head provided with a set of balls in which axially projecting pins of a carrier member, disposed alongside the bearing and separated from it by the bolt head, may engage. Another set of pins, axially projecting from the carrier member in the opposite direction, enter respective bores in the confronting extremity of the adjoining roller section; the pins and the bores should be so dimensioned as to allow for a limited radial shift between the carrier member and either of the roller sections.

As the purpose of this relative radial mobility is to be only to permit a certain angular displacement between the axes of the two sections without axial disalignment, I prefer to provide an extension on one of the sections in the form of an at least partly spherical head which engages in a depression of the other section and, together with the pins of the coupling member, helps maintain the two sections in a coplanar position of their axes. The carrier member, in this case, is advantageously a ring surrounding the aforementioned extension with annular clearance, the coupling pins being mounted on this ring with a sufficient eccentricity to insure satisfactory torque transmission between the sections.

The invention will be described in greater detail with reference to the accompanying drawing in which:

FIG. 1 is a longitudinal sectional view of confronting extremities of a pair of adjoining roller sections interconnected in conformity with the present invention;

FIG. 2 is a cross-sectional view taken on the line II—II of FIG. 1; and

FIG. 3 is a perspective view of a roller assembly having the construction illustrated in FIGS. 1 and 2.

Reference will be first made to FIG. 3 showing a roller assembly according to the invention. This assembly includes a plurality of supporting arms 12a, 12b, 12c, 12d which form a set of coaxial eyes accommodating respective ball bearings 14a, 14b, 14c, 14d. Rotatably lodged in the supports 12a, 12b, 12c, 12d, through the intermediary of the bearings 14a, 14b, 14c, 14d, are roller sections 10a, 10b, 10c and 10d which are detachably interconnected, in a manner more fully described hereinafter with reference to FIGS. 1 and 2, to constitute a composite roller. The last roller section 10d has been shown foreshortened and carries a pulley 44 driven via a belt 45 from a source of motive power not shown, the other roller sections serving as feeders for yarns or threads 46 in co-operation with respective pressure rollers as indicated in dot-dash lines at 47 for the section 10c. The number of roller sections, of course, will depend upon the specific requirements of the machine for which they are designed.

FIGS. 1 and 2 illustrate details of two adjoining roller sections, here designated 10 and 10′, the associated bearing and its cradle having been shown at 14 and 12, respectively. Bearing 14 has an inner race 16 and an outer race 22 separated by balls 15 which are held in position by an annular web 17. Outer race 22 is formed with a spherically concave inner surface 24 which rests on the balls 15 and permits these balls, together with inner race 16 and roller section 10, to swivel within the race 22. Guard rings 13, flanking the outer race 22, hold the latter in axially fixed position within its cradle 12.

The inner race 16 is clamped onto roller section 10 by a bolt 18 threadedly received in a bore 19 of that section. The bolt 18 has a flat head 20, acting as a retaining plate for the bearing 14, which compresses the race 16 against an adjoining shoulder of section 10 and which is received in a recess 30 of the adjoining roller section 10′. An extension 25 of bolt 18, projecting beyond its head 20, terminates in a partly spherical head 26 which engages in a depression 28 at the bottom of recess 30 whereby section 10′ is swivelably supported on this bolt extension.

A carrier ring 34, surrounding the extension 25 with annular clearance, has two pairs of pins 36 and 38 axially projecting therefrom in opposite directions along mutually perpendicular diameters. Pins 36 are received with radial play in a pair of eccentric bores 40 of plates 20, pins 38 being similarly accommodated by a pair of bores 42 in a shoulder 31 of recess 30 surrounding the depression 28. It will be noted that this recess 30 also extends, with clearance, around the plate 20 so that the outer surface of composite roller 10, 10′ is substantially continuous on opposite sides of bearing 14.

The arrangement just described enables the two roller sections 10, 10′ to swivel independently, the former with reference to bearing race 22, the latter with reference to head 26 of section 10. The coupling ring 34 with its pins 36, 38 resembles a universal joint and, by virtue of the radial play afforded by the bores 40 and 42, does not interfere with such limited swing of section 10′ in the axial plane of section 10. Thermal expansion of roller section 10′, during operation, is facilitated by the small gap present between this section and bearing 14 as well as by the axial clearance with which the ring 34 is received between the plate 20 and the shoulder 31.

Although the assembly described and illustrated is specifically adapted for use in spinning or twisting machinery, it will be apparent that the type of roller herein disclosed will also have utility in other environments as a driven or nondriven guide cylinder for filaments, sheets or the like.

I claim:
1. A roller assembly comprising an elongated roller axially subdivided into a plurality of adjoining sections, each pair of adjoining sections being provided with coupling means detachably interconnecting their extremities with freedom of limited relative axial shifting and angular displacement in a common axial plane, one of said extremities being provided with bearing means, said coupling means including a carrier member disposed alongside the respective bearing means and provided with axially oppositely extending first and second projections engaging with radial play in respective bores of the interconnected extremities of the associated pair of adjoining sections, and support means in the region of each junction receiving the respective bearing means, one of said extremities being provided with a retaining plate for said bearing means interposed between the latter and said carrier member, one set of said bores being formed on said retaining plate.

2. An assembly as defined in claim 1 wherein each of said bearing means is secured in axially fixed position in the respective support means.

3. An assembly as defined in claim 2 wherein said bearing means is a ball bearing which includes an outer race rigid with said support means and an inner race swingably lodged in said outer race.

4. An assembly as defined in claim 1 wherein said retaining plate is a head of a bolt threadedly engaging said one of said extremities, said bearing means including an inner race traversed by said bolt.

5. An assembly as defined in claim 1 wherein the other of said extremities is formed with an axial recess confronting said retaining plate and accommodating said carrier member.

6. An assembly as defined in claim 5 wherein said retaining plate is received within said recess.

7. An assembly as defined in claim 5 wherein said one of said extremities has an extension rigid with said retaining plate and terminating in an at least partly spherical head engaging in a depression at the bottom of said recess, thereby additionally interconnecting said adjoining sections.

8. An assembly as defined in claim 7 wherein said carrier or member is a ring surrounding said extension with annular clearance.

References Cited
UNITED STATES PATENTS

| | | | |
|---|---|---|---|
| 1,143,054 | 6/1915 | Lloyd | 64—6 X |
| 1,482,097 | 1/1924 | Smith | 64—11 |
| 1,504,608 | 8/1924 | Cowin | 64—10 |
| 1,512,872 | 10/1924 | Adkins et al. | 64—1 |
| 1,557,569 | 10/1925 | Eames et al. | 64—31 |
| 1,638,060 | 8/1927 | Reiners et al. | 64—1 X |
| 2,292,533 | 8/1942 | Maltman | 64—10 |
| 2,494,639 | 1/1950 | Yates | 64—10 |
| 2,595,393 | 5/1952 | Langdon | 64—31 X |
| 3,240,031 | 3/1966 | Takita | 64—1 X |

HALL C. COE, *Primary Examiner.*